United States Patent
Schuster et al.

(10) Patent No.: US 8,949,409 B2
(45) Date of Patent: Feb. 3, 2015

(54) METHOD AND SYSTEM OF MANAGING AND/OR MONITORING DISTRIBUTED COMPUTING BASED ON GEOMETRIC CONSTRAINTS

(75) Inventors: Assaf Schuster, Haifa (IL); Daniel Keren, Kiryat-Tivon (IL); Guy Sagy, Petach-Tikva (IL); Izchak Sherfman, Tel-Aviv (IL)

(73) Assignees: Technion Research & Development Foundation Limited, Haifa (IL); Carmel-Haifa University Economic Corporation Ltd., Haifa (IL)

( * ) Notice: Subject to any disclaimer, the term of this patent is extended or adjusted under 35 U.S.C. 154(b) by 973 days.

(21) Appl. No.: 12/817,242

(22) Filed: Jun. 17, 2010

(65) Prior Publication Data
US 2010/0325265 A1    Dec. 23, 2010

Related U.S. Application Data

(60) Provisional application No. 61/218,108, filed on Jun. 18, 2009.

(51) Int. Cl.
G06F 15/173 (2006.01)
H04L 29/08 (2006.01)
G06F 11/30 (2006.01)

(52) U.S. Cl.
CPC .......... *H04L 67/125* (2013.01); *G06F 11/3006* (2013.01); *G06F 11/3058* (2013.01); *H04L 67/12* (2013.01)
USPC ........... 709/224; 709/223; 709/226; 709/227; 709/228

(58) Field of Classification Search
USPC .......................... 709/223, 224, 226, 227, 228
See application file for complete search history.

(56) References Cited

U.S. PATENT DOCUMENTS

| 5,497,452 | A  | * | 3/1996  | Shimizu et al. ............... 345/420 |
| 5,701,405 | A  | * | 12/1997 | Kelley et al. ................. 345/441 |
| 6,963,824 | B1 | * | 11/2005 | Davidson et al. ................. 703/2 |
| 7,714,867 | B2 | * | 5/2010  | Doi et al. ....................... 345/441 |
| 2009/0077156 | A1 | * | 3/2009 | Kashyap et al. ............. 709/201 |
| 2009/0310496 | A1 | * | 12/2009 | Schuster et al. ............. 370/252 |

OTHER PUBLICATIONS

Efficient Constraint Monitoring Using Adaptive Thresholds, Kashyap et al., Bell Labs Technical Memorandum, ITD-06-47318H, 2006.*

(Continued)

*Primary Examiner* — Rupal Dharia
*Assistant Examiner* — Van Kim T Nguyen

(57) ABSTRACT

A method for managing distributed computing. The method comprises estimating, for each of a plurality of local computing nodes, a distribution of multidimensional values in a space. Each multidimensional value is calculated according to a plurality of locally monitored parameters. The method further includes calculating safe zones in the space where each safe zone is defined according to a respective estimated distribution under a global geometric constraint in the space and setting local geometric constraints for the local computing nodes according to the respective safe zones. Each local geometric constraint is defined such that a detection of at least one monitored multidimensional value violating it by a respective local computing node induces a communication event between the respective local computing node and one or more central computing nodes.

26 Claims, 7 Drawing Sheets

(56) References Cited

OTHER PUBLICATIONS

A Geometric Approach to Monitoring Threshold Functions Over Distributed Data Streams, SIGMOD 2006, Jun. 27-29, 2006, Chicago, Illinois, USA.*

Babcock et al. "Distributed Top-K Monitoring", Proceedings of the 2003 ACM SIGMOD Conference, San Diego, CA, USA, Jun. 9-12, 2003, p. 28-39, 2003.

Babu et al. "Continuous Queries Over Data Streams", ACM SIGMOD Recors, 30(3): 109-120, Sep. 2001.

Bulut et al. "Distributed Data Streams Indexing Using Content-Based Routing Paradigm", Proceedings of the 19th IEEE International Parallel and Distributed Processing Symposium, IPDPS '05, Denver, CO, USA, Apr. 3-8, 2005, 10 P., 2005.

Carney et al. "Monitoring Streams—A New Class of Data Management Applications", Proceedings of the 28th International Conference on Very Large Data Bases (VLDB), Hong Kong, China, Aug. 20-23, 2002, p. 215-226, 2002.

Cherniack et al. "Scalable Distributed Stream Processing", Proceedings of the 1st Biennal Confernce on Innovative Data Systems Research, CIDR, Asilomar, CA, USA, Jan. 5-8, 2003, 12 P., 2003.

Cormode et al. "Holistic Aggregates in a Networked World: Distributed Tracking of Approximate Quantiles", Proceedings of the 2005 ACM SIGMOD International Conference on Management of Data, Baltimore, MD, USA, Jun. 14-15, 2005, p. 25-36, 2005.

Dilman et al. "Efficient Reactive Monitoring", IEEE Journal on Selected Areas in Communications, 20(4): 668-676, May 2002.

Gibbons et al. "Distributed Streams Algorithms for Sliding Windows", Proceedings of the 14th Annual ACM Symposium on Parallel Algorithms and Architectures, SPAA '02, Winnipeg, Manitoba, Canada, Aug. 10-13, 2002, p. 63-72, 2002.

Gibbons et al. "Estimating Simple Functions on the Union of Data Streams", Proceedings of the 13th Annual ACM Symposium on Parallel Algorithms and Architectures, SPAA '01, Crete, Grece, Jul. 4-6, 2001, p. 281-291, 2001.

Jain et al. "A Wakeup Call for Internet Monitoring Systems: The Case for Distributed Triggers", Proceedings of HotNets-III, 6 P., 2004.

Manjhi et al. "Finding (Recently) Frequent Items in Distributed Data Streams", Proceedings of the 21st International Conference on Data Engineering, ICDE 2005, Tokyo, Japan, Apr. 15-18, 2005, p. 767-778, 2005.

Olston et al. "Adaptive Filters for Continuous Queries Over Distributed Data Streams", Proceedings of the 2003 ACM SIGMOD Conference on Management of Data, San Diego, CA, USA, Jun. 9-12, 2003, p. 563-574, 2003.

Sharfman et al. "A Geometric Approach to Monitoring Threshold Functions Over Distributed Data Streams", ACM Transactions on Database Systems, 32(4/Art.23): Nov. 1-29, 2007.

Terry et al. "Continuous Queries Over Append-Only Databases", Proceedings of the 1992 ACM International Conference on Management of Data, SIGMOD, San Diego, CA, USA, Jun. 2-5, 1992, p. 321-330, 1992.

* cited by examiner

METHOD AND SYSTEM OF MANAGING AND/OR MONITORING DISTRIBUTED COMPUTING BASED ON GEOMETRIC CONSTRAINTS

RELATED APPLICATION

This application claims the benefit of priority under 35 USC 119(e) of U.S. Provisional Patent Application No. 61/218,108 filed Jun. 18, 2009, the contents of which are incorporated by reference as if fully set forth herein.

FIELD AND BACKGROUND OF THE INVENTION

The present invention, in some embodiments thereof, relates to method and system of communication management and/or monitoring and, more particularly, but not exclusively, to method and system of managing and/or monitoring communication among a plurality of nodes.

As the scale, the volume and the rate of the data streams of today's networked systems continue to increase, algorithms and tools for effectively analyzing them are becoming an important research mandate. Powerful tools for sophisticated data processing and analysis such as relational and online analytical processing (OLAP) query engines, decision trees, association rule mining, feature selection and classification, ranking, statistical analysis, phase-change detection, anomaly and outlier detection, and the like are used for extracting correlations, patterns, and knowledge. These tools are used for understanding hidden mechanisms, decision making, optimizing the operation of complex and autonomous systems, improving user interaction with automated services, and many other critical tasks. For example, in a keynote he gave on "Extreme Data mining" at SIGMOD 2008, Sridhar Ramaswamy from Google said, referring to the log files generated at the Google data centre: "they are our only source of truth". At the same time they are "orders of magnitude larger than any other data in our system".

The data-management and data-mining research communities pride themselves on the ability of their technologies to scale to large amounts of data. Traditional data processing and analysis systems are built on the assumption of centralized and static data sets, an assumption which is not valid in large-scale networked systems in which a plurality of connected, distributed, dynamic sources of evolving information streams, are used. Two crucial scalability dimensions which effect the computation in distributed networked systems are the degree of distribution and the dynamicity of the data. The degree of distribution is a key scalability metric for massive networked systems, having a plurality of nodes, for example hundreds of millions, such as the Internet and P2P networks. In addition, the information residing in such systems is invariably dynamic in nature, with continuous streams of data flowing from a variety of sources, including packet traces, system logs, communication protocols, multiple sensor modalities, and mobile pervasive-computing devices and applications.

An example for such distributed systems includes a monitoring system having a plurality of distributed sensors. For example, a tsunami detection system that has a plurality of distributed sensors for measuring water pressure over a wide area in the ocean. The combined readings of these sensors are used to predict whether a tsunami is going to strike. The system must be able to issue correct warnings to save lives; however, false alarms are undesirable, as they may result in the needless measures, such as evacuation. Power and computational resource limitations define the continuity of the sensors' broadcast of their readings to a central monitoring station. Wireless sensors have restricted power supply that can support a limited number of transmissions and the central node usually cannot analyze all of the incoming data on the fly. In other distributed domains, more restrictions come to play, such as huge data volumes: for example, in a network-traffic monitoring scenario, a simple calculation shows that capturing only IP-packet-header information over a single 1 Gigabit/s Ethernet link can easily give rise to Terabytes of data each day.

During the last years, various solutions have been developed to improve and decrease the reaction time of distributed systems. For example, U.S. Patent Application No. 2009/0310496, filed on Mar. 14, 2007 describes a method for distributed computing, which includes processing multiple sets of data at respective computing nodes, and calculating respective local values of one or more statistical parameters characterizing the sets of the data. A global condition is defined, such that the condition is violated when a function defined over a weighted average of the respective local values crosses a predetermined threshold. The global condition is separated into a plurality of local geometric constraints, which include a respective local geometric constraint to be evaluated by each of the nodes based on the respective local values, such that violation of the respective local geometric constraint in at least one of the nodes indicates a violation of the global condition. The local geometric constraint is evaluated independently at each of the nodes. When at least one of the nodes detects that the respective local geometric constraint is violated, an indication that the global condition has been violated is produced.

SUMMARY OF THE INVENTION

According to some embodiments of the present invention, there is provided a method for managing distributed computing. The method comprises estimating, for each of a plurality of local computing nodes, a distribution of a plurality of multidimensional values in a space, each the multidimensional value being calculated according to a plurality of locally monitored parameters, calculating a plurality of safe zones in the space, each the safe zone being defined according to a respective the distribution under a global geometric constraint in the space, and setting a plurality of local geometric constraints for the plurality of local computing nodes according to respective the plurality of safe zones, each the local geometric constraint being defined such that a detection of at least one violating monitored multidimensional value by a respective the local computing node inducing a communication event between the respective local computing node and at least one central computing node.

Optionally, the global geometric constraint is set by combining the plurality of safe zones.

Optionally, the geometric constraint is set by calculating a Minkowski sum of the plurality of safe zones.

Optionally, the geometric constraint is a Cartesian product of the plurality of safe zones.

Optionally, each the multidimensional value is calculated as a function of the plurality of locally monitored parameters.

Optionally, the calculating is performed by estimating a probability density of the respective plurality of multidimensional values in the space.

Optionally, each the safe zone is selected from a group consisting of a polygon, a polyhedra, and a polyhedral.

More optionally, each the safe zone is convex.

Optionally, each the safe zone is an axis-aligned rectangle.

Optionally, each the safe zone has a bounded number of vertexes.

According to some embodiments of the present invention, there is provided a distributed computing system that comprises a plurality of local computing nodes each set to monitor a plurality of multidimensional values and to detect when at least one of the plurality of multidimensional values violating a respective of a plurality of local geometric constraints derived of a global geometric constraint and to output an indication for the violation, each the multidimensional value being set according to a plurality of respective locally monitored parameters, and at least one central computing node. The plurality of local geometric constraints are set according to a plurality of safe zones, each the safe zone being defined according to an estimation of distribution of respective local multidimensional values in a space monitored by a respective of the plurality of local computing nodes, the geometric constraint being set according to a combination of the safe zones.

Optionally, the plurality of respective locally monitored parameters are outputs of at least one sensor.

Optionally, the plurality of respective locally monitored parameters are logs of at least one of a database and a monitoring unit.

Optionally, the plurality of respective locally monitored parameters are logs of at least one cloud computing monitoring entity.

Optionally, the plurality of respective locally monitored parameters are traffic data of at least one of a traffic sensor and a traffic data centre.

Optionally, the at least one sensor is selected from a group consisting of an image sensor, a pressure sensor, a vibration sensor, a motion sensor, a pollutant sensor, a temperature sensor, and a sound sensor.

Optionally, the at least one central computing node is set to output an alert in response to the indication.

According to some embodiments of the present invention, there is provided a method for managing communication of a local computing node in a network. The method comprises providing an estimation of a distribution of a plurality of multidimensional values in a space, each the multidimensional value being monitored by the local computing node and set according to a plurality of locally monitored parameters, setting a local geometric constraint according to a safe zone in the space, the safe zone being defined according to a respective the distribution, under a global geometric constraint in the space, the global geometric constraint being set by combining a plurality of safe zones of a plurality of local computing nodes, processing a plurality of current multidimensional values, each the multidimensional value being set according to a plurality of locally monitored current parameters, and initiating a communication event with a central computing node when one of the plurality of current multidimensional values violate the local geometric constraint.

Optionally, the initiating comprises transmitting an alert notification to a central computing node.

Optionally, the space, each the multidimensional value, and the safe zone having at least three dimensions.

Optionally, the communication event comprises forwarding an alert to the central computing node via the network.

Optionally, the plurality of locally monitored current parameters comprise outputs of a plurality of local sensors.

According to some embodiments of the present invention, there is provided a non-transitory tangible medium having a computer readable program code embodied therein. The computer readable program code adapted to be executed to implement the following set of instructions: estimating a distribution of a plurality of multidimensional values in a space, each the multidimensional value being set according to a plurality of locally monitored parameters, setting a local geometric constraint according to a safe zone in the space, the safe zone being defined according to a respective the distribution, under a global geometric constraint in the space, the global geometric constraint being set by combining a plurality of safe zones of a plurality of local computing nodes, processing a plurality of current multidimensional values, each the multidimensional value being set according to a plurality of locally monitored current parameters, and initiating a communication event with a central computing node when one of the plurality of current multidimensional values violate the local geometric constraint.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. The patent or application file contains at least one drawing executed in color. Copies of this patent or patent application publication with color drawing(s) will be provided by the Office upon request and payment of the necessary fee.

In the drawings.

Figure 6:
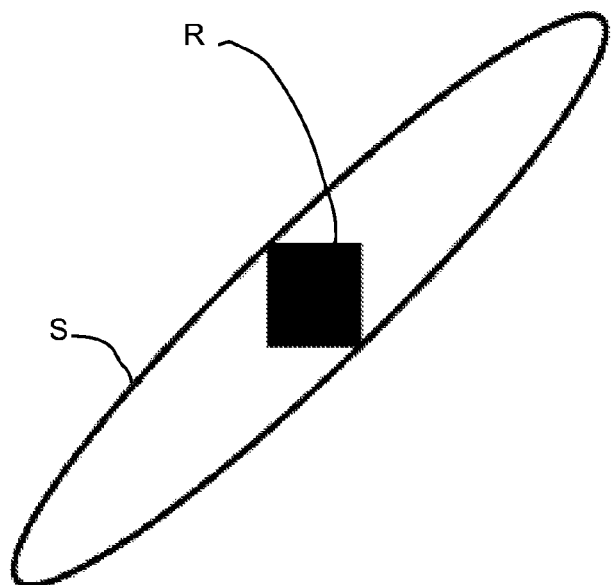
Figure 7A:
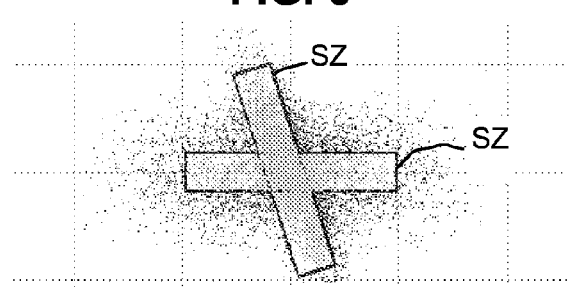
Figure 7B:
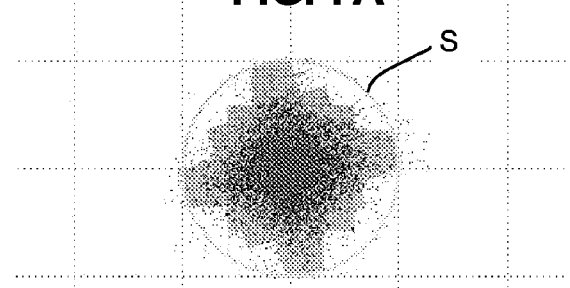
Figure 7C:
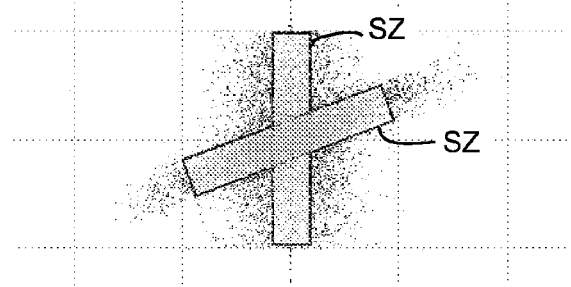
Figures 8A, 8B, 8C:
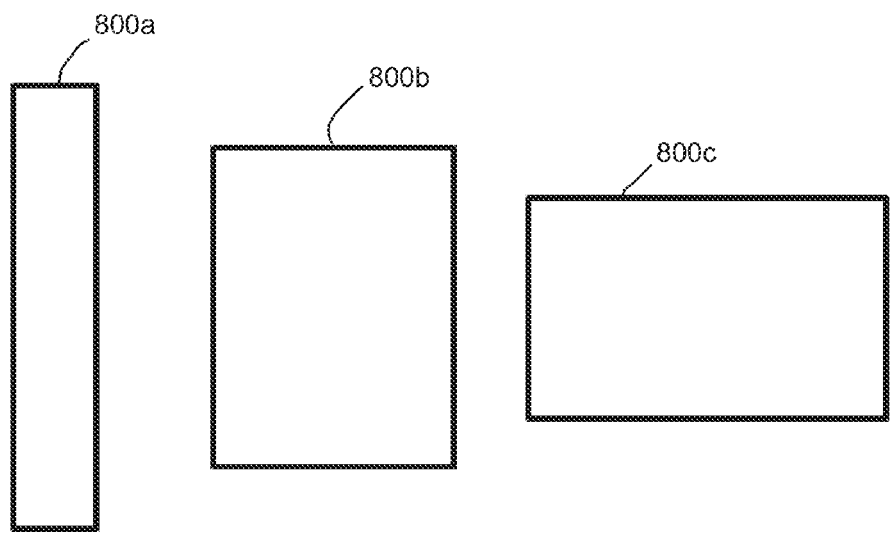
Figure 9A:
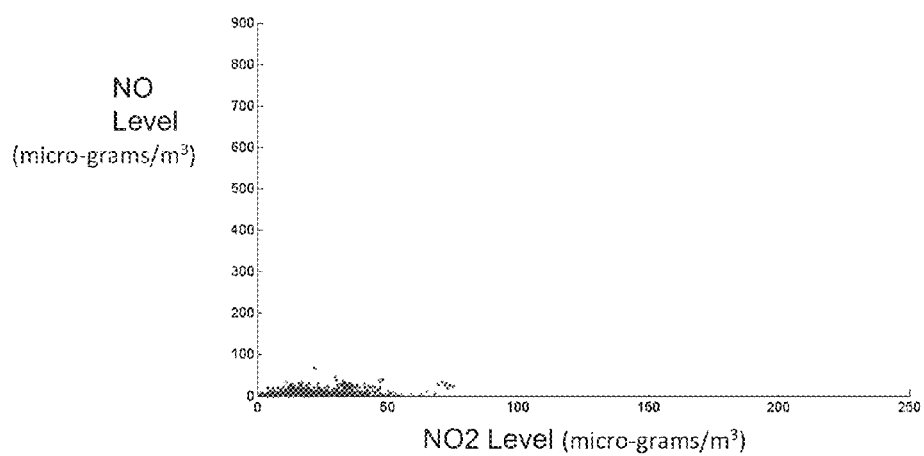
Figure 9B:
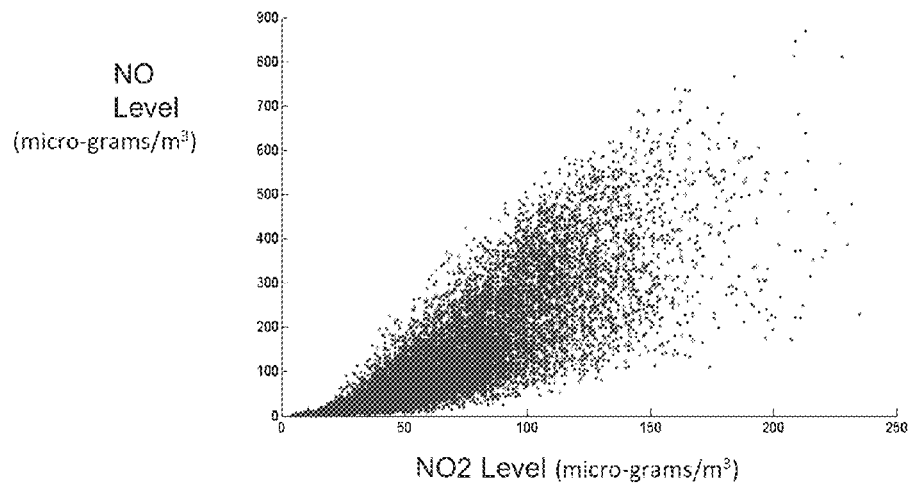
Figure 10:
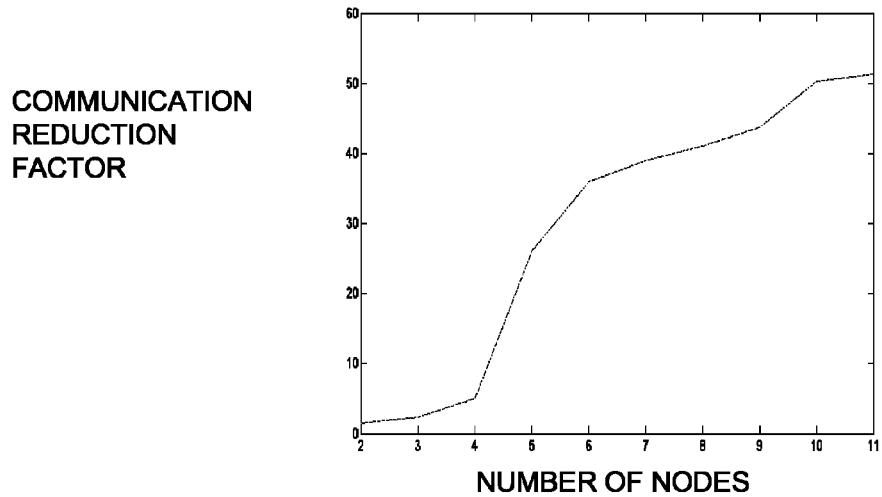
Figure 11A:
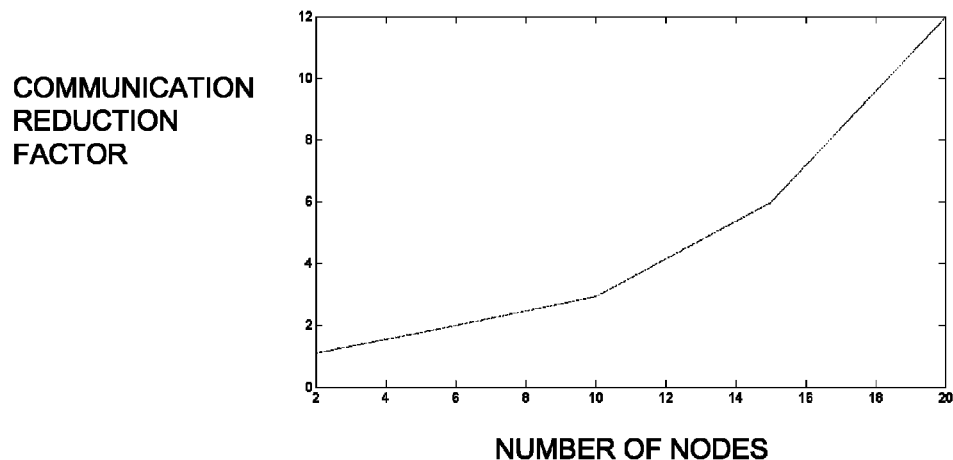
Figure 11B:
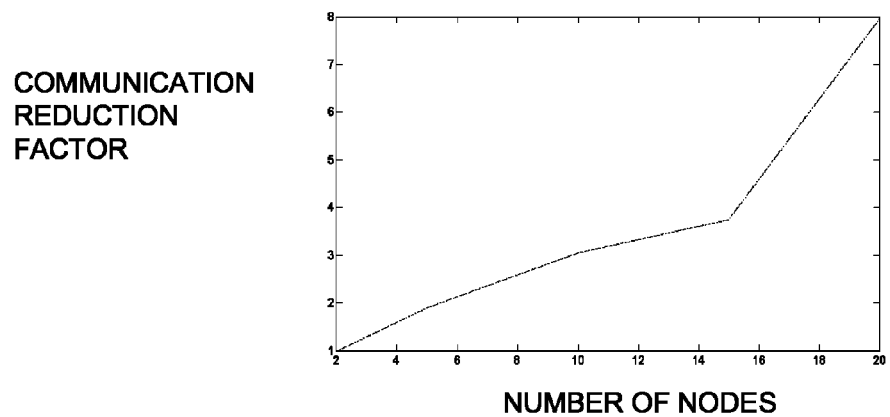

contained in S, no alert or another communication message is sent;

FIGS. 5A-5F are schematic illustrations of distribution of data monitored by exemplary local computing nodes in a space and respective safe zones, according to some embodiments of the present invention;

FIG. 6 is a schematic illustration of a set S (the ellipse) and its maximal inscribed axis-aligned rectangle R which provide a poor approximation to S;

FIGS. 7A-7C are schematic illustrations a union of exemplary safe zones, according to some embodiments of the present invention;

FIGS. 8A-8C are schematic illustrations two exemplary safe zones and the Minkowski average thereof, according to some embodiments of the present invention;

FIGS. 9A and 9B depict scatter diagrams in which Nitrogen Dioxide (NO2) levels corresponding to the x-axis and Nitrogen Monoxide (NO) corresponding to the y-axis;

FIG. 10 is a graph depicting a comparison between single rectangle safe zones, optimized according to the aforementioned embodiments and the Previous Work methods, where the horizontal axis denotes a number of nodes and a vertical axis denotes a communication reduction factor; and FIGS. 11A and 11B are graphs which respectively depict a reduction in communication when using the probabilistic algorithm with a false negative probability of 0.5%, compared with the deterministic algorithm, when using both synthetic and real data.

DESCRIPTION OF EMBODIMENTS OF THE INVENTION

The present invention, in some embodiments thereof, relates to method and system of communication management and/or monitoring and, more particularly, but not exclusively, to method and system of managing and/or monitoring communication among a plurality of nodes.

According to some embodiments of the present invention there are provided systems and methods of managing communication between a plurality of local computing nodes and one or more central computing nodes by using local geometric constraints, which are optionally derived from a global geometrical constraint, for locally monitoring parameters which are tracked independently at each node.

The method is based on estimating the distribution of multidimensional values set according to local parameters monitored by each node, and defining accordingly a set of safe zones under a global geometrical condition. As used herein, a safe zone is a zone which indicates which multidimensional values should not induce a communication event between a local computing node and one or more central computing nodes, such as alert notifications and reports. The global geometrical condition is optionally a requirement that the Minkowski sum of all safe zones is contained in S, where $S=\{z|f(z)\leq T\}$, where $f$ denotes a scoring function and T denotes a threshold. Now, the safe zones are assigned to each local computing node such that while the parameters are in its safe zone, the global geometrical condition guarantees that the global value of the monitored function has not crossed the threshold value.

By using safe zones as local geometrical constraints, linear and/or non linear functions may be monitored in each node. This is different from previous methods in which the focus is on monitoring linear functions, see I. Sharfman, A. Schuster, and D. Keren, "A geometric approach to monitoring threshold functions over distributed data streams", ACM Transactions on Database Systems, 32.4, 2007 and I. Sharfman, A. Schuster, and D. Keren, "Shape sensitive geometric monitoring", ACM PODS 2008, which are incorporated herein by reference. It should be noted that in these methods there is no optimality criterion in the definition of the local constraints, so that all the local constraints are non-adaptable and the same for all nodes. Such local constraints may perform poorly if the distribution of the data in the distinct nodes is different. Moreover, the computational complexity of checking the constraints at the nodes is relatively high. It should be noted that a distributed threshold detection algorithm for one-dimensional data and a restricted set of functions (polynomials with positive coefficients), for example as described in S. Shah and K. Ramamritham, "Handling Non-linear Polynomial Queries over Dynamic Data", IEEE ICDE 2008, which is incorporated herein by reference, cannot be used for managing multi dimensional data in various linear and/or non linear functions.

In some embodiments of the present invention, the local geometrical constraints are set according to safe zones which are fitted to the data distribution at each node. The computational task of matching data streams to local geometrical constraints is performed at the nodes.

Such methods and/or systems reduce the energy and/or computational complexity which are required for node communication. Thus the implementation of these methods in battery-powered and/or thin nodes environments, such as wireless sensor networks and mobile robots, may increase their robustness and reduces their costs and/or maintenance costs.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
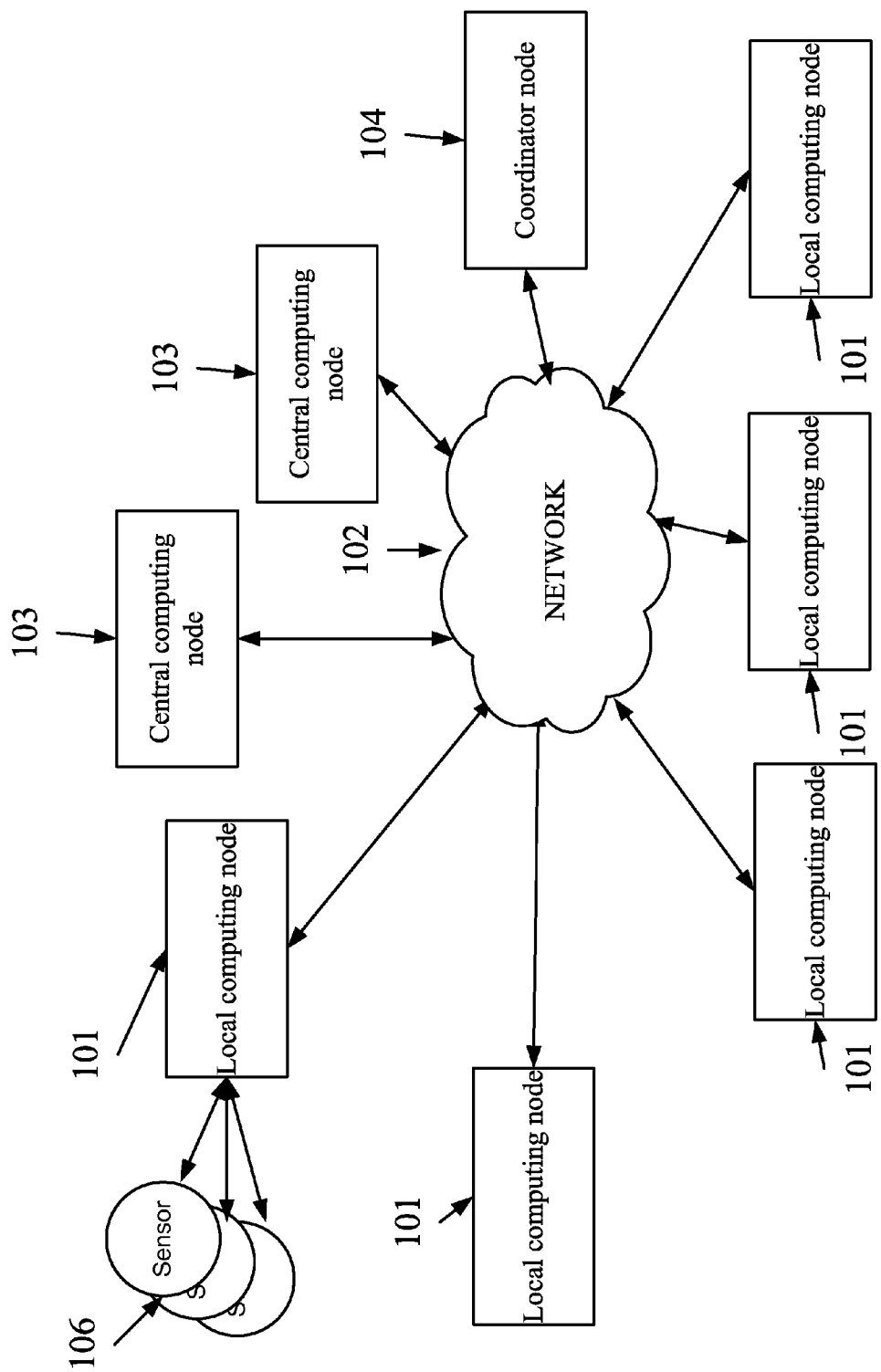
FIG. 1 is schematic illustration of a distributed computing system having a plurality of local computing nodes which are connected, via a network, to one or more coordinators, according to some embodiments of the present invention.

Reference is now made to FIG. 1, which is schematic illustration of a distributed computing system 100 having a plurality of local computing nodes 101 which are connected, via a network 102, such as the internet or a peer to peer network, to one or more central computing nodes 103, according to some embodiments of the present invention. As used herein, a local computing node means one or more computing units, such as servers, client terminals, thin clients, supercomputers, workstations, desktops, laptops, smartphones, central processing unit (CPU) based devices and the like, which are set to locally process a plurality of parameters from one or more sources, such as sensors, detectors, local or remote databases, machine interfaces, and/or user interfaces, for example a server, a client terminal, a router and the like. Optionally, the local computing nodes 101 are distributed in separate geographical locations. Although some of the embodiments described below refer to nodes that are physically distant from one another, the principles of the present invention are in no way limited to such conditions. The nodes can be adjacent to one another when distributed computing is implemented.

The distributed computing system 100 further includes one or more central computing nodes 103. As used herein, a central computing node means one or more computing units which are set to receive, via a cable based infrastructure or wirelessly messages, such as Transmission Control Protocol Internet Protocol (TCP/IP) messages, for example alerts, reports, or notifications, from a plurality of local computing nodes 101. A central computing node may include one or more servers, client terminals, thin clients, supercomputers, workstations, desktops, laptops, smartphones, CPU based devices and the like. The local computing nodes 101 are set to initiate one or more communication events with one or more central computing nodes 103, optionally when one or more of the local geometrical constraints are violated. The transmission may be performed in various communication protocols, for example as TCP/IP messages.

As further described below, a local geometrical constraint or a local threshold, which may be alternatively referred to herein, is geometrically calculated for each local computing node 101. In such embodiments, the local computing nodes 101 use the local thresholds for determining which data to transmit to the central computing nodes 103 and/or when to transmit data and/or notifications to the central computing nodes 103. The local geometrical constraint may optimize the efficiency of the communication between the local computing nodes 101 and the one or more central computing nodes 103 by reducing the prevalence of false positive communication events, such as alert notifications, in a manner that allows reducing the bandwidth of the communication between them and/or reducing the computational power used by the one or more central computing nodes 103 and/or transmission energy required for them.

For clarity and brevity, reference is now made to a number of definitions. $f$ denotes a function, $p_i$ denotes a data tuple, optionally a vector of $p_1 \ldots p_n$ parameters at the $i^{th}$ node of n nodes and T denotes a threshold. The parameters are dynamic, and the system 100 is set to alert and/or react whenever the value of $f(p_1, p_2 \ldots p_n)$ crosses T. For example, if one of the nodes 101 is connected to a plurality of sensors, as shown by numeral 106, each $p_i$ is a measurement of an individual sensor, and $f$ denotes a function that determines a value that is above or below certain of threshold value, given the entire collection of local measurements. For example, the distributed system is a collection of spatially distributed autonomous devices composed of sensors coupled with a broadcast mechanism, which cooperatively monitor physical or environmental conditions, such as temperature, sound, vibration, pressure, motion or pollutants, at different locations. The distributed system, which is optionally, a wireless sensor network (WSN) system, may consist of thousands of sensors distributed over a large area—usually on the ground but also at sea. Such a distributed system may be used for monitoring river flooding, tsunami, and earthquake warnings. These tasks require the nodes to very quickly identify imminent danger and report it. In such an embodiment, the local computing node 101 sends a warning when the value of the function violates the local geometric constraint. For example, the sensors are tsunami detection sensors, the threshold value may be indicative of a danger from an imminent tsunami. In another example, the local computing nodes 101 monitor functions which are based on parameters of image sensors which detect possible crime scenes by analyzing a certain activity level, such as an anxiety level, a fear level, and/or a stress level. In another example, the local computing nodes 101 monitor functions describing the impact of traffic and/or mobility over parameters of traffic sensors or traffic data centers. In another example, the distributed system is a cloud computing system in which each local computing node 101 monitors another segment of the cloud. The monitored function is optionally of parameters, such as streams of activity logs and machine counters collected at each of its elements: compute, storage, services, scheduling, security, management, and the like.

It should be noted that the distributed system 100 may be used for implementing a wide range of alerts and/or triggers of distributed, dynamic systems, for example a decision to issue a warning of impending natural disaster, a conclusion regarding multiple peers, for example that a new cluster of similar itineraries is emerging from an overall population of mobile users, and/or any other outcome of a computing system that is based on multiple input units. Such an ability to answer threshold crossing queries may be used as a building block of data processing and/or data mining tools, including for example top-k queries, feature selection, association rule mining, and/or computing correlations. Optionally, the thresholding is used for data classification, for example, thresholding a neural net or support vector machine output may be used to determine a type of volcanic tremor and the like, see M. Masotti, S. Falsaperla, H. Langer, S. Spampinato, and R. Campanini, "Application of Support Vector Machine to the classification of volcanic tremor at Etna, Italy", Geophysical Research Letters, October 2006, which is incorporated herein by reference.

According to some embodiments of the present invention, $f$ is defined as follows:

$$f\left(\frac{p_1 + p_2 + \ldots + p_n}{n}\right) \qquad \text{Equation 1}$$

where such a function may be used for decisions which are based on global statistics stored in the system, where $p_i$'s are local statistics vectors received, computed, and/or processed at the local computing nodes 101. The function $f$ may be set to check correlation between a plurality of data streams or inputs, for example, the occurrence of two diseases. In such an embodiment, the parameters may be local vectors such as contingency tables of the diseases in various localities and $f$ is applied on an average (global) contingency table, for example as a correlation coefficient function or chi-square distribution function. Though reference is made to this type of functions, the suggested systems and methods are general and may be applied to other functions, for example when the global vector, which represents data from the entire system, is not an average but a concatenation of local vectors.

Figure 2:
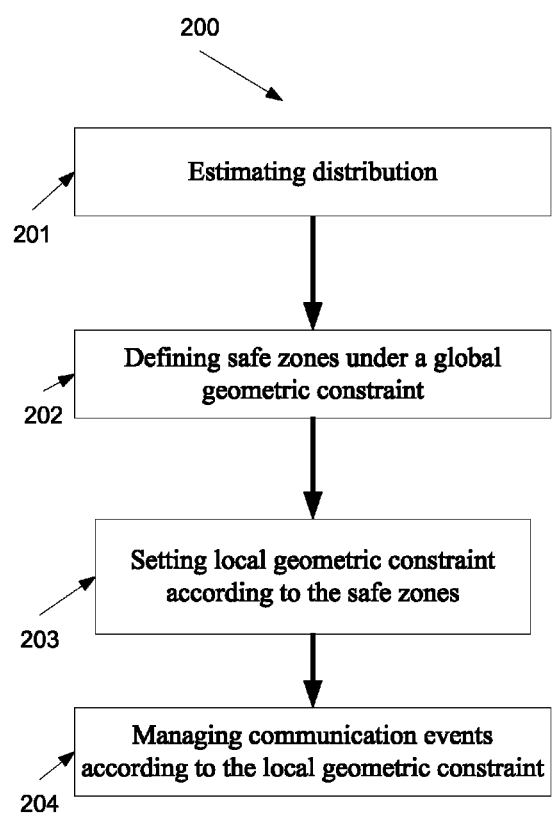
FIG. 2 is a flowchart of a method of managing a distributed computing system, according to some embodiments of the present invention.

Reference is now also made to FIG. 2, which is a flowchart 200 of a method of managing a distributed computing system, according to some embodiments of the present invention.

First, as shown at 201, for each of one of the computing nodes 101, a distribution of a plurality of multidimensional values in a multidimensional space is estimated. The multidimensional values are optionally an outcome of a monitored function that is based on a plurality of parameters from one or more sources. Optionally, the distribution is calculated by measuring a discrete sample of the parameters received and/or monitored by each local computing node 101 during a sampling period. For example, when the local computing node 101 receives outputs of a plurality of sensors, such as seismic sensors, the distribution may be determined by an analysis of historic readings, for example during a period of few days, weeks, months, and/or years. The multidimensional value may be set according to outputs of a number of sensors, a combination of a sensor output and information regarding the output, for example location and time, and/or tuple processed by the respective local computing node.

Optionally, Expectation-Maximisation (EM) algorithm is used to fit models such as Gaussian Mixture Models (GMM) to the data. Optionally, discrete probability to model real data, which is typically given as a set of points in Euclidean space, is used.

This allows, as shown at 202, for each of one of the computing nodes 101, defining a distribution of multidimensional values by a local geometric zone that bounds a multidimensional subspace in the multidimensional space. The local geometric zone is set such that a global geometric constraint defined according to a sum of all the local geometric zones is maintained. The local geometric zones may be referred to herein as optimal safe zones or safe zones. Each safe zone is set so that as long as all the local values of the respective local computing nodes 101 remain within its boundaries, the function $f$ does not cross the threshold, and in addition, of all sub-sets satisfying this property, the safe zone is optimal in the sense that the local data and/or messages which are based thereupon remain local as long possible, for example as described below. For a real-world system, this means that as long as the local data remains within a certain domain, no communication is required.

The global geometric constraint is optionally defined in the space by combining the plurality of safe zones of some or all of the local computing nodes 101. Reference is now made to an exemplary system 100 having two nodes 101 where the function $f$ is monitored by computing at the average of two local vectors based on local data streams, each vector of another node. In such an embodiment, $S=\{z|f(z) \leq T\}$, where T denotes a threshold. The threshold is set so that if the average of the local vectors of the nodes 101 is not in S, one of the local vectors is outside the safe zone that is related thereto and therefore at least one of the nodes 101 has to take an action which involves communication with the one or more central computing nodes 103, or any other network nodes. For clarity, x and y denote local vectors and $S_x$, $S_y$ denote respective safe zones. It should be noted that no conditions are imposed on the range of values $f(z)$ but on the domain vectors z.

Optionally, each safe zone is defined as a geometric condition for example as follows:

$$x \in S_x \wedge y \in S_y \Rightarrow \frac{x+y}{2} \in S \qquad \text{Equation 2}$$

where if the condition is not satisfied, a global vector, which is formed by a concatenation of the local vectors, wanders outside S but no communication event, such as an alert message or a similar communication, is initiated.

Optionally, a safe zone is optimized by maximizing the following:

$$\int_{S_x} p_x \, dx \int_{S_y} p_y \, dy \qquad \text{Equation 3}$$

under the following constraint:

$$\frac{S_x \oplus S_y}{2} \subset S \text{ or } \frac{S_x \oplus S_y}{2} = \left\{ \frac{x+y}{2} \,\middle|\, x \in S_x, y \in S_y \right\} \qquad \text{Equation 4}$$

where $p_x$, $p_y$ denote distributions on the local data received at the nodes 101 and/or processed or calculated by the nodes 101. Equation 4 is also known as the Minkowski sum of $S_x$, $S_y$, in which every element is divided by 2, for example as described in J. P. Serra, "Image Analysis and Mathematical Morphology", Academic Press, London, 1982, which is incorporated herein by reference. For any global vector having n nodes, the Minkowski sum of the local safe zones may be calculated as the union of all the safe zones, divided by n, the number of nodes. It should be noted that when the global vector is a concatenation of the local vectors of some or all the nodes 101, the Minkowski sum may be replaced by the Cartesian product to which this solution methodology applies. The practical meaning of the constraint $$\frac{S_x \oplus S_y}{2} \subset S$$

is straightforward: assume for example that the local vectors are the local contingency tables of two features, built from the data at the respective nodes, and that S is the set of contingency tables satisfying a certain condition (e.g. that the mutual information of both features is above a certain threshold T). The solution then assigns to each node a certain subset of contingency tables, with the constraint that as long as the local contingency tables remain within their respective subsets (safe zones); their average is a contingency table whose mutual information is greater than T. The maximization of the target function $$\int_{S_x} p_x \, dx \int_{S_y} p_y \, dy$$

means that, under this constraint, the expectation of the time period it will take one of the local contingency tables to wander out of its safe zone is maximal; since communication is required only when the local table leaves its safe zone, this is equivalent to minimizing the communication.

Figure 3:
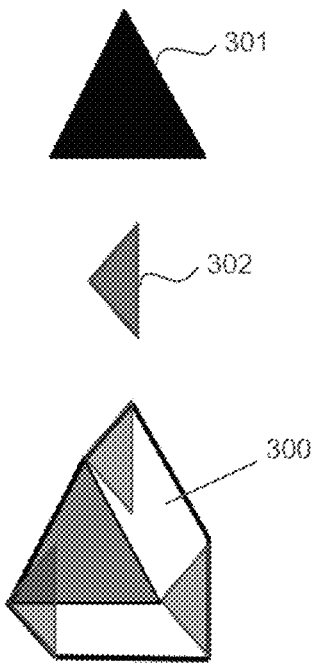
FIG. 3 is a schematic illustration of two triangles (top and center) and their Minkowski sum (bottom), with its outline marked by a thick dark line.

Reference is now made to the Minkowski sum. Its definition is the same as that of the sum of vector sub-spaces, but it is applied to all subsets of the ambient Euclidean space, not necessarily sub-spaces. For clarity, the working space is the plane $\Re^2$, and A,B denote subsets of the plane. The Minkowski sum of A, B is defined to be a set consisting of all sums with one summand from A and one from B for example as follows:

$$A \oplus B \equiv \{a+b | a \in A, b \in B\} \qquad \text{Equation 5}$$

where an extension to more than two summands is straightforward. This may be used for a global vector which is the sum, average, or any other cumulative operation held on the local vectors at the nodes. Optionally, the central computing node(s) 103 is set to identify the safe zone of each local computing node 101, but not its actual data vector, so the global vector can be any member of the Minkowski sum. Optionally, one or more operations are performed for extracting the global vector, for example if the global vector is the average of the local vectors, it's the set obtained by dividing every member in the Minkowski sum by the number of nodes 101, which may be referred to herein as Minkowski average. FIG. 3 is a schematic illustration of a Minkowski sum 300 of geometric shapes, triangles, which represent two summands 301, 302. The depicted Minkowski sum fulfills the following $$A \oplus B = \bigcup_{a \in A} (\{a\} \oplus B)$$

where $\{a\} \oplus B$ is the translation of B by a. As depicted in FIG. 3, the Minkowski sum of two shapes can be visualized as a union of copies of the first shape, with one copy for each point in the second set, where each such copy is obtained by translating the first shape by the point of the second. Intuitively, this union is obtained by placing the first shape on the second, sliding it over, and taking the union of all the copies of the first shape thus obtained. The Minkowski sum behaviour under unions which may be seen by the following: $A \oplus (B \cup C) = (A \oplus B) \cup (A \oplus C)$. Therefore, summing two complicated shapes may be obtained by expressing them as the union of simpler shapes, summing those, and unifying these partial sums.

Now, as shown at 203, each safe zone is used for setting a local geometrical constraint for each local computing node 101. Optionally, the optimization and assignment of safe zones is initially performed by a coordinator node 104, which may be one of the central computing nodes or a designated node, as shown at numeral 104. The coordinator may be implemented by one or more computing units, such as servers, client terminals, thin clients, supercomputers, workstations, desktops, laptops, smartphones, central processing unit (CPU) based devices and the like. The coordinator node 104 assigns each local computing node 101 with its safe zone so that the assigned node does not send a communication message to the central computing node(s) 103 as long as local data vectors remain inside their safe zone.

Optionally, the local geographical constraint is set as a target function is created over the local geometric zone. For the GMM model, Gaussian integrals are calculated. Since the local geometric zone may be constructed from simple geometric primitives, the integrals can be computed quickly, either directly or by numerical methods such as Markov Chain Monte Carlo. For the discrete case, the points which fall in the local geometric zone are counted and Range Searching methods may be used for calculation.

Now, as shown at 204, communication events of each local computing node 101 may be managed according to the local geometrical constraint that is defined according to the respective safe zone. Once one of the local computing nodes identifies a violation, for example when a local vector that wanders out of the respective safe zone, it notifies the one or more central computing nodes 103. The one or more central computing nodes may then issue an alert message, trigger a process, reset the safe zone, and/or choose a sub-optimal but efficient heuristic of averaging a few local vectors, for example as described in I. Sharfman, A. Schuster, and D. Keren, "A geometric approach to monitoring threshold functions over distributed data streams", ACM Transactions on Database Systems, 32.4, 2007, which is incorporated herein by reference.

The optimized safe zones, which are constrained to the global geometric constraint, allow setting local geometrical constraints for transmitting or otherwise triggering a communication event, such as an alert notification, a message, and/or another communication message when the global vector is not in S or is estimated to leave the boundaries of S. In such a manner, as long as every local vector is inside the respective optimized safe zone, and the Minkowski average of the optimized safe zones is estimated to be in the boundaries of S, no communication event, such as an alert or a communication message transmission, is performed by one of the local computing nodes. A simple example is presented in FIG. 4.

The forming of a global geometric constraint, for example by calculating the Minkowski average, is based on safe zones which have an area or a space maximized as described above and reduces the communication bandwidth between the computing nodes. The geometric constraint, expressed via the Minkowski average, guarantees correctness as long as it holds and the related threshold is not crossed.

Optionally, the product of the probabilities of the local data to remain inside their safe zones reduces the communication as a local computing node communicates if and only if its local vector exits its safe zone and such a product maximizes the probability that both local computing nodes remain inside their safe zones.

Reference is now made to a geometric description of the calculating such a probabilistic expression. Optionally, a probability density function (p.d.f), which may be referred to herein as density, is matched with each safe zone at each node, so as to maximize the probability of local data to fall in its safe zone. For example, a distribution that is wide in the x-axis and narrow in the y-axis should be assigned with a safe zone that is wider horizontally than vertically.

Figures 5A, 5B, 5C:
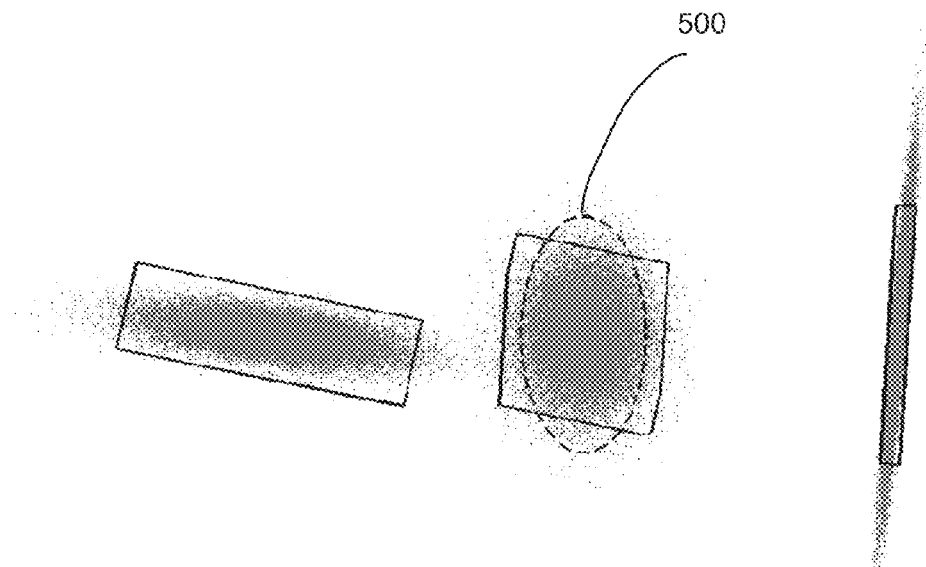
Figures 5D, 5E, 5F:
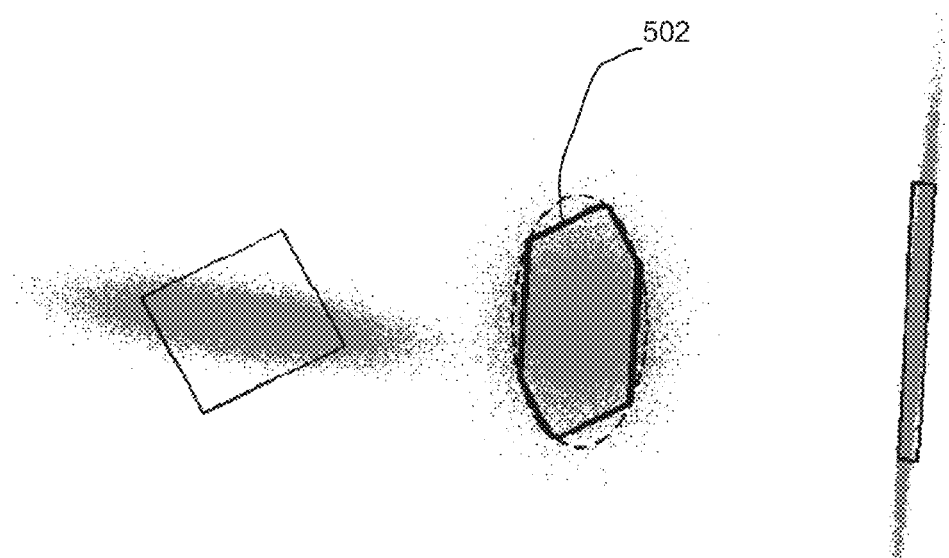

In such a manner, the global geometric constraint, which is based on the geometrically optimized safe zones, for example the Minkowski average of the safe zones, tightly approximates S (from the inside). If it fills a relatively small part of S, this means that the safe zones may be enlarged and the value of the optimized function increased. For example, reference is now made to FIGS. 5A-5F, which are schematic illustrations of distribution of data monitored by exemplary local computing nodes in a space and respective safe zones, according to some embodiments of the present invention. FIGS. 5A and 5C denote samples of two-dimensional data tuples at two nodes. The p.d.f, which is calculated for both nodes, is a Gaussian (normal) distribution. The p.d.f may be Gaussians, for example as described in I. Sharfman, A. Schuster, and D. Keren, "Shape sensitive geometric monitoring", ACM PODS 2008, which is incorporated herein by reference, random walk, for example as described in S. Shah and K. Ramamritham, "Handling Non-linear Polynomial Queries over Dynamic Data", IEEE ICDE 2008, which is incorporated herein by reference, uniform, or any other p.d.f. FIG. 5B depicts, a dotted ellipse 500 placed in the middle S and set to contain the Minkowski average of the two safe zones depicted in FIGS. 5A and 5C. In FIG. 5B, S contains a point cloud which is a sample of the global data tuple, obtained by averaging the local data at both local computing nodes. The depicted safe zones are set to fit the local data well, alas they are illegal, since their Minkowski average (quadrangle 502 marked by continuous dark line in the middle) is not inside S. FIGS. 5D and 5F depict legal safe zones, where FIG. 5D tries to match the local data, while satisfying the constraint. FIG. 5D demonstrates a trade-off between the fit of the safe zones and the related local data and the necessity to maintain their Minkowski average inside S. Note that the Minkowski average tightly approximates S as safe zones have to be as large as possible, namely, the integral of the p.d.f over them is as large as possible. If the Minkowski average does not approximate S, it is possible to enlarge the safe zones and hence the integral of the p.d.f over them, thus they would not have been optimal. In FIG. 5E, S contains a point cloud which is a sample of the global data tuple, obtained by averaging the local data at two local computing nodes, which the distribution thereof is depicted in FIGS. 5D and 5F.

Reference is now made to an algebraic description of calculating such a probabilistic expression. When monitoring read time data, optimized safe zones have to be calculated for a plurality of local computing nodes, such as 101. For the sake of simplicity, the description herein refers to two nodes and the data is two-dimensional. The following algorithms may apply to any two-dimensional data in any dimension and number of nodes.

For brevity, $f(\ )$ denotes a function of two variables T denotes a threshold, $N_1$, $N_2$ denote two local computing nodes, $v_1^0$, $v_2^0$ denote their initial two dimensional data vectors, t denotes the time the $i^{th}$ node holds a vector denoted as $v_i^t$, $p_1$, $p_2$ denote probability distributions at $N_1$, $N_2$ and $p_i$ denotes the p.d.fs of the data at the $i^{th}$ node. The aforementioned global vector, which represents a global threshold at time t, may be defined as follows $$v^t = \frac{v_1^t + v_2^t}{2}.$$

First, the local geometrical constraint is set as $$f\left(\frac{v_1^0 + v_2^0}{2}\right) \geq T,$$

so that a communication message, such as an alarm, is submitted when $$f\left(\frac{v_1^t + v_2^t}{2}\right) < T.$$

Denoting as before $S=\{z|f(z) \geq T\}$, the communication message is sent when $$\frac{v_1^t + v_2^t}{2} \notin S.$$

Now, the safe zones of the nodes are calculated, for example two subsets $S_1$, $S_2$ of the Euclidean plane $\Re^2$, which maximize $$\int_{S_1} p_1(z)dz \int_{S_2} p_2(z)dz,$$

subject to the following constraint $$\frac{S_1 \oplus S_2}{2} \subset S \left(\text{or } z_1 \in S_1 \wedge z_2 \in S_2 \Rightarrow \frac{z_1 + z_2}{2} \in S\right).$$

Now, the parameters to optimize over are determined. As the space of parameters may tend to infinity, all the subsets of the space may be candidates for $S_1$, $S_2$. This is a huge, infinite dimensional, non-linear space. Optionally, the optimization is restricted to a parametric family of shapes, denoted by $P_{shape}$. Optionally, $P_{shape}$ are set to reasonably approximate every subset of the plane which is a viable candidate for a safe zone. Optionally, $P_{shape}$ members are not too complicated for computation as the scope of possibilities is limited. Optionally, the computational complexity of calculating the integral of the $P_{shape}$ members is not too high. Optionally, the Minkowski average of any members of P is relatively easy to compute based on known algorithms.

Optionally, if the multidimensional values are two parameter data vectors which are received or monitored at local computing nodes, the geometric shape of some or all of the safe zones is set as a polygon. Similarly, if the data vectors at the local computing nodes have more than two parameters, the geometric shape of some or all of the safe zones is polyhedral. For brevity, a polyhedra and a polygon are referred to herein as a polygon. The polygon is flexible enough to approximate any domain in Euclidean space and allows testing the local geometrical constraints at a related node easily, for example using fast algorithms to test whether a point is inside a polygonal area, for example as described in P. Heckbert, (Ed.), "Graphic Gems IV", Academic Press, Boston, Mass., 1994, which is incorporated herein by reference. Moreover, the computational complexity of computing the integral of any reasonable p.d.f on a polygon is relatively easy.

Figure 4:
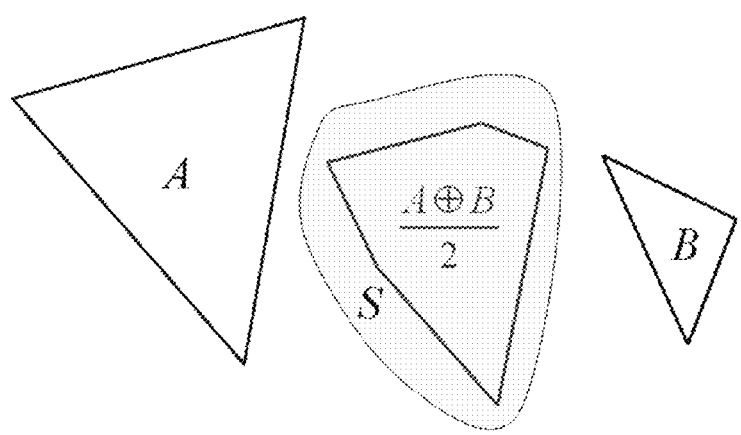
FIG. 4 is a schematic illustration of an exemplary Minkowski average where if safe zones, denoted in the figure as A and B satisfy $$\frac{A \oplus B}{2}$$

Optionally, the polygons have no more than n vertices (e.g. if n is three, the safe zones will consist of all triangles). It should be noted that although the Minkowski average of polygons is also a polygon, it may have more vertices than each of the summands, for example as depicted in FIG. 4. As a matter of fact, the Minkowski average of two general polygons, with m and n vertices, may have $O(m^2n^2)$ vertices, see R. Wein, "Exact and efficient construction of planar Minkowski sums using the convolution method", Proc. $14^{th}$ European Symposium on Algorithms (ESA), LNCS vol. 4186, 2006, which is incorporated herein by reference.

When a plurality of nodes are present, even if each of them has a safe zone that is a polygon with n vertices, the number of vertices in the overall Minkowski average may be high, and so is the complexity of using it to compute exceptions from S.

Optionally, the safe zone has a polygonal area shaped as an axis-aligned rectangle. The computing of the Minkowski average of such axis-aligned rectangles requires low computational complexity. The Minkowski average of two axis-aligned rectangles is an axis-aligned rectangle whose corners are the averages of the respective corners of the summands, for example as shown at FIG. 8B, which is a schematic illustration of the Minkowski average of the two safe zones which are depicted in FIGS. 8A and 8C. In this simple case, the lengths of the edges of the Minkowski average are equal to the average of the lengths of the respective edges of the safe zones.

Therefore, if the safe zones are axis-aligned rectangles, the computation of their Minkowski average is very simple. The complexity of computing the integral of a p.d.f on a rectangular region is also typically very low. The Minkowski average in this case is an axis-aligned rectangle which may not match properly the distribution of the data received by the distinct nodes, for example as shown in FIG. 6. However, for data whose distribution is relatively homogenous in a single area, such safe zones yields better results than those achieved in I. Sharfman, A. Schuster, and D. Keren, "A geometric approach to monitoring threshold functions over distributed data streams", ACM Transactions on Database Systems, 32.4, 2007 and I. Sharfman, A. Schuster, and D. Keren, "Shape sensitive geometric monitoring", ACM PODS 2008, which are incorporated herein by reference.

Optionally, the safe zones are calculated as a union of a few rectangles. This allows a tight approximation to S. For example, the union done by calculating the Minkowski average of the safe zones by the following identity $(\cup A_i) \oplus (\cup B_j) = \cup (A_i \oplus B_j)$ where as each element is easy to compute, the entire sum is straightforward to compute as well.

For example reference is now made to FIGS. 7A and 7C which are schematic illustrations a union of exemplary distribution rectangular safe zones which are formed according to data monitored by two local computing nodes 101. The grey (light) dots mark sample data tuples. As the distribution is not a Gaussian distribution, it cannot be covered well by a single rectangle. FIG. 7B depicts, in black (dark) dots, samples of global data tuples which are formed by an average of the data at the two local computing nodes 101 and in grey (light) dots the Minkowski average of the two safe zones (SZ). Note that, unlike the case depicted in FIGS. 7A and 7C where both safe zones (SZ) are single rectangles, the Minkowski average is more complicated than both safe zones (SZ), and can thus achieve a good fit to S.

According to some embodiments of the present invention, the set safe zones are convex polygons. The Minkowski average of two convex polygons with m and n vertices is also convex and therefore has at most m+n vertices, see R. Wein, "Exact and efficient construction of planar Minkowski sums using the convolution method", Proc. 14th European Symposium on Algorithms (ESA), LNCS vol. 4186, 2006, which is incorporated herein by reference.

Optionally, the number of vertices of the convex polygons is bounded according to the number of local computing nodes 101. For example, 1,000 local computing nodes 101 are used, the convex quadrangles may be formed as safe zones, yielding a Minkowski average with at most 4,000 vertices. Such a bounded amount may be managed by the coordinator node 110. Nodes which monitor data with a data distribution, having an area with a more complicated shape, may be assigned with polygons having more vertices.

As outlined above, the ability of a union, such as the Minkowski average, is used to cover a relatively large portion of an optimal set S where each optimized safe zones covers a substantial part of an optimal area of the local data distribution. If S is convex, the optimized safe zones are also convex and $$\frac{C(S_1) \oplus C(S_2)}{2} \subset S$$

where for every set Q, C(Q) denotes Q's convex hull.
This may be shown by the following. For brevity, explanation is provided herein for two safe zones where $$\frac{S_1 \oplus S_2}{2} \subset S$$

is set for a convex S. First, the following is set $x_1, y_1 \in S_1, x_2, y_2 \in S_2$, and $0 \leq \lambda_1, \lambda_2 \leq 1$, where without loss of generality $\lambda_2 \leq \lambda_1$. Since $$\frac{S_1 \oplus S_2}{2} \subset S,$$

it follows that $$\frac{x_1 + x_2}{2}, \frac{x_1 + y_2}{2}, \frac{y_1 + y_2}{2} \in S.$$

As S is convex, $$v = \lambda_2 \frac{x_1 + x_2}{2} + (\lambda_1 - \lambda_2) \frac{x_1 + y_2}{2} + (1 - \lambda_1) \frac{y_1 + y_2}{2} \in S.$$

Thus, $$v \equiv \frac{\lambda_1 x_1 + (1 - \lambda_1) y_1 + \lambda_2 x_2 + (1 - \lambda_2) y_2}{2} \in S$$

and the combination of elements of S (all coefficients are positive and their sum equals 1), is convex. If one of $S_1, S_2$ was not convex, its convex hull would have been a viable candidate for the respective safe zone which is strictly larger than $S_1$ or $S_2$, contradicting their optimality.

As S is convex, the optimized safe zones are convex as well. Optionally, the optimized safe zones are convex polygons with k vertices.

For brevity, C denotes a convex subset of the plane, k denotes a fixed integer, $C_k$ denotes the maximal value of the ratio $$\frac{A(P_k)}{A(C)},$$

where A denotes area and $P_k$ denotes any convex polygon with k vertices inscribed in C. Then the minimal value of $C_k$ is obtained when C is a geometric figure whose surface is at all points equidistant from the center, for example a disk in a two dimensional space and a sphere in a three dimensional space or higher. These geometric figures are the convex sets which may be approximated by inscribed polyhedral, when k increases, $C_k$ behaves as $$1 - \frac{\alpha}{k^2}$$

for some small constant $\alpha$. When this proposition is followed, parametric family of convex polygons having a bounded number of vertices provides a good approximation to general convex sets, hence using such polygons as optimized safe zones provides a good solution with less communication bandwidth.

Optionally, the computational complexity of the optimization depends on the number of local computing nodes 101 and the safe zone of each one of them. These factors determine the number of computed parameters. For example, while a general convex quadrangle 800b is defined by eight parameters, for example as shown at FIG. 8B, an axis-aligned rectangle 800a, 800c requires only four, for example, two coordinates for two opposite corners, as shown as FIGS. 8A and 8C, respectively, and a general rectangle requires five parameters, for example, coordinates of two adjacent corners and the length of the edge perpendicular to the edge they define. Generally, each safe zone is defined by k parameters and if n nodes are present, the general optimization problem therefore has kn parameters to optimize over.

"A geometric approach to monitoring threshold functions over distributed data streams" and ACM Transactions on Database Systems, 32.4, 2007 and Sharfman, A. Schuster, and D. Keren, "Shape sensitive geometric monitoring", ACM PODS 2008, which are incorporated herein by reference, and optimized only over a part of the nodes, for example over nodes having data distributions which are wide or complicated relative to the others.

Optionally, if kn is above a certain threshold, some of the safe zones may be computed using methods as described in I. Sharfman, A. Schuster, and D. Keren, "A geometric approach to monitoring threshold functions over distributed data streams" and ACM Transactions on Database Systems, 32.4, 2007 and Sharfman, A. Schuster, and D. Keren, "Shape sensitive geometric monitoring", ACM PODS 2008, which are incorporated herein by reference, and optimized only over a part of the nodes, for example over nodes having data distributions which are wide or complicated relative to the others.

As described above, each optimized safe zone is used to assign a local geometrical constraint for the respective local computing node. Each one of the local geometrical constraints is defined for the respective node such that violation of said respective local geometric constraint induces a communication event between the respective node and a central computing node. By assigning such local geometrical constraint, a rigid framework in which absolute accuracy is required may be formed. Every local geometrical constraint crossing induces a communication event. In such an embodiment, the communication events may be of applications in which such absolute certainty is required.

According to some embodiments of the present invention, a small error probability is allowed, for example about 0.01%. In such embodiments, false negative communication events are allowed. It is often the case that allowing a rather low probability for false negatives considerably reduces the running time. Further, the noisy nature of real data often makes it too strict a requirement to report all threshold crossing, since cases in which the function slightly increases beyond the threshold may be due to random noise. Some work along these directions is N. Alon, P. Gibbons, Y. Matias, and M. Szegedy, "Tracking join and self-join sizes in limited storage", Proc. Eighteenth ACM SIGACT-SIGMOD-SIGART Symposium on Principles of Database Systems, 1999, G. Cormode and M. Garofalakis. "Histograms and Wavelets on Probabilistic Data", IEEE ICDE 2009, and G. Cormode and S. Muthukrishnan, "Estimating dominance norms of multiple data Streams", Proc. 11$^{th}$ European Symposium on Algorithms, 2003, which are incorporated herein by reference.

In order to allow a small probability error, the condition $$\frac{S_x \oplus S_y}{2} \subset S,$$

and its generalization to more than two nodes, guarantees that every threshold crossing is reported, with the following condition:

$$Pr\left[\forall_i (v_i \in S_i) \left| \frac{\sum_i v_i}{n} \notin S \right.\right] < \varepsilon$$

where $v_i$, $S_i$ denote local vector and safe zone at the i$^{th}$ node, and $\varepsilon$ denotes a small positive constant representing the error probability. This condition guarantees that if the global system vector (which equals the average of the local vectors) wanders out of S, then, with a probability at least 1−$\varepsilon$, a communication event will be triggered by one or more of the nodes. The examples described below demonstrate such a relaxation of the local geometrical constraints.

According to some embodiments of the present invention, the safe zones are not optimized. In such an embodiment, safe zones may be calculated as follows. First, an initial vector $v_i^0$ is set for each i$^{th}$ and denotes the average of all these vectors by $v^0$. Then, for every local computing node i, the following is computed:

$$S_i = \{v_i^0 - v^0\} \oplus C$$

where C denotes any convex sub-set of S which contains $v^0$ and $S_i$, which is the translation of C by $v_i^0 - v^0$, is a safe zone for node i. This can be shown by setting, for every i, a vector $c_i \in C$ such that $v_i = (v_i^0 - v^0) + c_i$, so $$\frac{\sum_i v_i}{n} = \frac{\sum_i (v_i^0 - v^0)}{n} + \frac{\sum_i c_i}{n}$$

$$= \frac{\sum_i (v_i^0)}{n} - v^0 + \frac{\sum_i c_i}{n}$$

-continued $$= v^0 - v^0 + \frac{\sum_i c_i}{n}$$

$$= \frac{\sum_i c_i}{n} \in C \subset S$$

The methods and systems described above suggest a very general approach to monitoring arbitrary functions, not necessarily linear or monotonic, defined over aggregated data which is distributed between nodes. A communication event, such as an alerting message, is sent when the function's value crosses a certain threshold. The value of the function on the aggregated data may be ignored while its value on the individual nodes is evaluated. In use, the domain over which the function is defined is tracked. Viewing this domain in purely geometric terms, an optimized safe zone is defined at each node, such that as long as the local data tuples remain in them, the value of the function at the global data vector will not cross the threshold. A rigorous optimality criterion may be provided for the computation of the safe zones, which also considers the distribution of the data at the nodes and may handle even radically different distributions at distinct nodes. In the examples below, experimental evaluation using real-world data shows that the efficiency and flexibility of the new method results in orders of magnitude reduction in the communication volume over previously used methods. Further, the improvement over the previously used method increases as the number of nodes increases.

As embodiments described above allow managing the communication in distributed computing systems in more efficient manner as the communication bandwidth and energy consumption may be reduced. Such management may be used various applications. For example, the aforementioned management may be used in Real-time monitoring Large-Scale Sensor Networks, Real-time Monitoring of Massive Distributed Logs in Clouds and Data Centres, Internet-Scale Query Processing (ISQP) Systems and the like. Optionally, the aforementioned management is used for managing central logging and/or error reporting. In such an embodiment the communication events are messages which are sent by the local computing nodes with data that describe a certain malfunction and/or an event that extends from the normal distribution and therefore violate the local geographic constraint.

It is expected that during the life of a patent maturing from this application many relevant methods and systems will be developed and the scope of the term a sensor, a node, a computing node, and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

In order to test the methods and systems described above, a multi node system having a communication protocol that is based on the aforementioned optimized local geometrical constraints has been implemented. In order to emulate the local data, a large data-set consisting of measurements of various air pollutants in Europe has been used, see AirBase: The European air quality database in http://dataservice.eea.europa.eu/dataservice/metadetails.asp?id=1079.

The used real data is consisted of 10,000 timestamps; each timestamp corresponds to a simultaneous measurement at the distinct nodes. The tested optimized safe zones where one and two rectangles. The outcome was compared with the results described in I. Sharfman, A. Schuster, and D. Keren, "A geometric approach to monitoring threshold functions over distributed data streams", ACM Transactions on Database Systems, 32.4, 2007 and I. Sharfman, A. Schuster, and D. Keren, "Shape sensitive geometric monitoring", ACM PODS 2008, which are incorporated herein by reference and referred to herein as the Previous Work methods.

The optimization of the safe zones was performed using the MATLAB constrained optimization routine fmincon. As in the Previous Work, performance was measured by the total number of messages sent by the nodes to a coordinator; every time the local data at a node is calculated as wandering out of a respective safe zone, the node notifies the coordinator.

Reference is now made to FIGS. 9A and 9B, which depict scatter diagrams in which Nitrogen Dioxide (NO2) levels corresponding to the x-axis and Nitrogen Monoxide (NO) corresponding to the y-axis. Both are measured in micrograms per cubic meter. Nodes correspond to measurement locations. The S we used is a rectangular region, 80 micrograms/cubic meters wide in the x direction and 400 wide in the y direction. S was centred at the average of the local data vectors. The data at different nodes greatly varies, as can be seen from FIGS. 9A and 9B.

In this example, 11 local nodes are tested. To implement the aforementioned method, the p.d.f at the different nodes was estimated by a discrete sample of 10% of the data. The performances with both one rectangle and two rectangle safe zones have been tested, and compared the results with the Previous Work methods. The results show a considerable improvement over Previous Work methods, with the improvement factor increasing with the number of nodes. Results for single rectangle safe zones are depicted in FIG. 10, which is a graph depicting a comparison between single rectangle safe zones, optimized according to the aforementioned embodiments and the Previous Work methods. The horizontal axis of the graph denotes the number of nodes and the vertical axis denotes a communication reduction factor.

A further reduction in communication, by factors ranging between 2.5 and 3, was yielded by implementing the algorithm for the real data with safe zones consisting of two rectangles, with 2-11 nodes. This factor did not significantly change with the number of nodes. Altogether the reduction in the communication factor ranged from 2.5 for two nodes to 115 for 11 nodes.

In another example, a probabilistic version of the algorithm was implemented with an error probability bounded by 0.5% ($\epsilon=0.005$). Both synthetic and real data were tested where synthetic data was consisted of normal distributions at the nodes, with variances randomly chosen in the range 1-30 at each axis. The real data was the same as that used in the deterministic algorithm. Up to 20 nodes were tested in both cases, and compared the result with those of the deterministic algorithm. Here, too, the reduction in communication increased with the number of nodes. FIGS. 11A and 11B are graphs which respectively depict a reduction in communication when using the probabilistic algorithm with a false negative probability of 0.5%, compared with the deterministic algorithm, when using both synthetic and real data. The horizontal axis denotes the number of nodes and the vertical axis denotes a communication reduction factor.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for managing distributed computing, comprising:
calculating a plurality of sets of multidimensional values in a space, each said set of multidimensional values is calculated based on a plurality of locally monitored parameters monitored by one of a plurality of local computing nodes;
providing a global geometric constraint defining boundaries in a space;
estimating for each one of said plurality of local computing nodes one of a plurality of probabilistic distributions based on a respective of set of multidimensional values from said plurality of sets of multidimensional values;
calculating for each one of said plurality of local computing nodes one of a plurality of safe zones in said space, each said safe zone being defined according to said plurality of probabilistic distributions under said global geometric constraint; and
wherein a violation is detected by a first of said plurality of local computing nodes when at least one current multidimensional value calculated according to parameters locally monitored by said first local computing node crosses a respective safe zone from said plurality of safe zones;
wherein said detection induces a communication event between said detecting local computing node and at least one central computing node.

2. The method of claim 1, wherein said global geometric constraint includes being set by combining said plurality of safe zones.

3. The method of claim 1, wherein said global geometric constraint is set by calculating a Minkowski sum of said plurality of safe zones.

4. The method of claim 1, wherein said geometric constraint is a Cartesian product of said plurality of safe zones.

5. The method of claim 1, wherein each said multidimensional value is calculated as a function of said plurality of locally monitored parameters.

6. The method of claim 1, wherein said calculating is performed by estimating a probability density of said respective plurality of multidimensional values in said space.

7. The method of claim 1, wherein each said safe zone is of a different non-spherical shape selected from a group consisting of a polygon, a polyhedra, and a polyhedral.

8. The method of claim 7, wherein each said safe zone is convex.

9. The method of claim 1, wherein each said safe zone is an axis-aligned rectangle.

10. The method of claim 1, wherein each said safe zone has a bounded number of vertexes.

11. The method of claim 1, wherein said plurality of safe zones have different shapes.

12. A distributed computing system, comprising:
a plurality of local computing nodes each set to monitor a plurality of multidimensional values in a space and to detect a violation when at least one of said plurality of multidimensional values crossing one of a plurality of safe zones defined under a global geometric constraint defining boundaries in said space and to output an indication for said violation, each said multidimensional value being set according to a plurality of respective locally monitored parameters; and
at least one central computing node;
wherein each one of said plurality of safe zones is defined according to an estimation of probabilistic distribution of respective local multidimensional values in said space, said respective local multidimensional values are calculated based on a of locally monitored parameters monitored by one of said plurality of local computing nodes,
wherein said global geometric constraint is set according to a combination of said plurality of safe zones.

13. The system of claim 12, wherein said plurality of respective locally monitored parameters are outputs of at least one sensor.

14. The system of claim 12, wherein said plurality of respective locally monitored parameters are logs of at least one of a database and a monitoring unit.

15. The system of claim 12, wherein said plurality of respective locally monitored parameters are logs of at least one cloud computing monitoring entity.

16. The system of claim 12, wherein said plurality of respective locally monitored parameters are traffic data of at least one of a traffic sensor and a traffic data centre.

17. The system of claim 13, wherein said at least one sensor is selected from a group consisting of an image sensor, a pressure sensor, a vibration sensor, a motion sensor, a pollutant sensor, a temperature sensor, and a sound sensor.

18. The system of claim 12, wherein said at least one central computing node is set to output an alert in response to said indication.

19. A method for managing communication of first of a local computing nodes from in a network, comprising:
providing an estimation of a probabilistic distribution of a plurality of multidimensional values in a space, each said multidimensional value being calculated according to a plurality of locally monitored parameters monitored by the first local computing node;
setting a safe zone in said space for said first local computing node, said safe zone being defined according to said probabilistic distribution and a plurality of probabilistic distributions each defined for another of said local computing nodes under a global geometric constraint in said space;
processing a plurality of current multidimensional values, each said multidimensional value being set according to a plurality of locally monitored current parameters monitored by said first local computing node to detect at least one violation of said safe zone when at least one of said plurality of multidimensional values crosses said safe zone; and
initiating a communication event between said first local computing node and a central computing node when said at least one violation is detected.

20. The method of claim 19, wherein said initiating comprises transmitting an alert notification to a central computing node.

21. The method of claim 19, wherein said space, each said multidimensional value, and said safe zone have at least three dimensions.

22. The method of claim 19, wherein said communication event comprises forwarding an alert to said central computing node via the network.

23. The method of claim 19, wherein said plurality of locally monitored current parameters comprise outputs of a plurality of local sensors.

24. The method of claim 19, wherein each said safe zone is of a non-spherical shape selected from the group consisting of a polygon, and a polyhedral.

25. A non-transitory tangible medium having a computer readable program code embodied therein, said computer readable program code adapted to be executed to implement the following set of instructions:
   estimating for a first of a local computing nodes a probabilistic distribution of a plurality of multidimensional values in a space, each said multidimensional value being set according to a plurality of locally monitored parameters monitored by said first of a local computing nodes;
   setting a safe zone in said space, said safe zone being defined according to said probabilistic distribution and a plurality of probabilistic distributions each defined for another of said local computing nodes under a global geometric constraint in said space;
   processing a plurality of current multidimensional values, each said multidimensional value being set according to a plurality of locally monitored current parameters monitored by said first local computing node to detect at least one violation of said safe zone when at least one of said plurality of multidimensional values crosses said safe zone; and
   initiating a communication event between said first local computing node and a central computing node when one of said plurality of current multidimensional values violate said safe zone.

26. The non-transitory tangible medium of claim 25, wherein each said safe zone is of a non-spherical shape selected from the group consisting of a polygon, and a polyhedral.

* * * * *